United States Patent
Vigars

(10) Patent No.: US 8,147,195 B2
(45) Date of Patent: Apr. 3, 2012

(54) ORIENTATION DEVICE FOR WATER CURRENT POWER GENERATING APPARATUS

(75) Inventor: Paul Vigars, Fishponds (GB)

(73) Assignee: Tidal Generation Limited, Derby (GB)

(*) Notice: Subject to any disclaimer, the term of this patent is extended or adjusted under 35 U.S.C. 154(b) by 403 days.

(21) Appl. No.: 12/440,897

(22) PCT Filed: Sep. 7, 2007

(86) PCT No.: PCT/GB2007/003388
§ 371 (c)(1), (2), (4) Date: Mar. 11, 2009

(87) PCT Pub. No.: WO2008/032025
PCT Pub. Date: Mar. 20, 2008

(65) Prior Publication Data
US 2010/0038911 A1 Feb. 18, 2010

(30) Foreign Application Priority Data
Sep. 12, 2006 (GB) .................................. 0617883.4

(51) Int. Cl.
F03B 13/00 (2006.01)
F03B 7/00 (2006.01)

(52) U.S. Cl. ............................................. 416/9; 290/54

(58) Field of Classification Search .................... 290/43, 290/53–54; 416/9–17, 108, 112–115; 415/8, 415/126–127
See application file for complete search history.

(56) References Cited

U.S. PATENT DOCUMENTS

| | | | |
|---|---|---|---|
| 4,026,587 A * | 5/1977 | Hultman et al. | 290/53 |
| 5,440,176 A | 8/1995 | Halning | |
| 5,798,572 A * | 8/1998 | Lehoczky | 290/54 |
| 6,104,097 A * | 8/2000 | Lehoczky | 290/54 |
| 6,956,300 B2 * | 10/2005 | Gizara | 290/43 |
| 7,105,942 B2 * | 9/2006 | Henriksen | 290/55 |

FOREIGN PATENT DOCUMENTS

| | | | |
|---|---|---|---|
| CA | 2421139 A1 * | 9/2004 | |
| GB | 2 256 011 A | 11/1992 | |
| GB | 2 348 250 A | 9/2000 | |
| WO | WO 03/046375 A1 | 6/2003 | |
| WO | WO 2005/017349 A1 | 2/2005 | |
| WO | WO 2006054084 A1 * | 5/2006 | |

OTHER PUBLICATIONS

International Search Report corresponding to International Application No. PCT/GB2007/003388, mailed Apr. 10, 2008.
Great Britain Search Report corresponding to GB Application No. GB0617883.4, date of search May 21, 2007.

* cited by examiner

Primary Examiner — Matthew W Such
(74) Attorney, Agent, or Firm — Husch Blackwell LLP

(57) ABSTRACT

A water current generating device is provided that consists of a main body and a horizontal axis rotor attached by a mechanical connection to a fixed support structure. Under the action of one or more hydrodynamic thrusters, the main body of the turbine is rotated about a desired axis of rotation to face the oncoming current flow. The mechanical connection incorporates an appropriate degree of freedom to allow this re-orientation to take place.

15 Claims, 3 Drawing Sheets

ORIENTATION DEVICE FOR WATER CURRENT POWER GENERATING APPARATUS

BACKGROUND

This invention relates to the design of apparatus for extracting energy from water currents. Specifically, the invention provides a means of aligning a water current generating device with the current flow, such that it can accommodate changes in current direction on a periodic basis.

The direction of current flow in estuaries and tidal races usually changes according to a prescribed periodic pattern. As an example tidal currents typically reverse direction by approximately 180 deg roughly every six hours when the flood or ebb tides turn. As the tide is turning the current speed is very low or stationary for a short period of time around slack water. This invention seeks to take advantage of such a period of slow moving or stationary flow to re-orientate a water current generating device.

PRIOR ART

Proposed methods that allow a water current generator to accommodate significant changes in current direction on a periodic basis include:

Mechanical Yaw drive. This is the technique used by the wind industry where there is a requirement for the rotor to face the wind blowing from any direction, but it can also be adopted for use on a water current turbine. The turbine rotor is yawed around using a mechanical friction or geared drive mounted on the turbine nacelle, which reacts against the tower (or vice-versa). Due to the relatively small radius at which the yaw drive is typically mounted (usually equivalent to the support tower radius), a high reaction force is required to provide adequate torque to re-orientate the turbine. Water born particles and debris could causing fouling or wear of such a drive unless it is sealed from the external environment (which is expensive on a large diameter yaw bearing). The design requires tight control of mechanical tolerances between the moving gear/friction drive unit and the stationary reaction gear/surface.

Fixed rotor with full span pitch control This technique can be used where the current changes direction by approximately 180 deg each current cycle. When the current direction changes each rotor blade is rotated 180 deg about its respective lengthwise axis to face the opposite direction. In hydrodynamic terms this has the same effect as yawing the rotor through 180 deg. This scheme has the drawback that the rotors must operate in the wake of the support structure for one direction of current flow. It also introduces efficiency losses and asymetric rotor loading if the two current directions are not 180 deg apart.

Fixed rotor employing fixed pitch reverse flow blades. The rotor blade aerofoil section is designed to allow the blades to operate with flow coming from opposite directions without adjusting their pitch or turning the rotor in any way. This can be achieved using a blade aerofoil section profile which is symmetric about both the local blade chord and vertical axes (an example would be a flattened ellipse profile). There will be significant efficiency losses associated with this design of blade section. Such a fixed blade pitch rotor will rely on hydrodynamic stall control to limit the output power, which does not provide a very controllable means of power regulation.

Positively buoyant rotor tethered to seabed: A fully submerged positively buoyant rotor (or group of rigidly connected rotors) is tethered to the seabed. When the rotors are generating they are supported mid water column by the balancing forces of turbine thrust, buoyancy, and the resultant tension in the mooring tethers. The level of the rotors in the water column changes with the current speed and amount of thrust generated. When the current reverses direction the rotors flip vertically over to point the other direction. The main disadvantage of this system is the potential for undesired dynamic response of the entire main body of the water current generating device on its flexible moorings. This is of particular concern if there is any significant turbulence or wave induced fluctuations in the current flow. The tethered mooring arrangement also makes it more difficult to protect electrical power cables running from the turbines to the seabed.

STATEMENT OF THE INVENTION

The present invention seeks to provide a means of orientating a water current generating device to face the oncoming current flow which overcomes the disadvantages of prior art.

The invention uses thrusters to change its orientation.

The apparatus comprises:
One or more hydrodynamic thrusters permanently fitted to the main body of the water current generating device.
A bearing or attachment connecting the main body of the water current generating device with its sea or river bed foundation support structure, providing a degree of freedom about the desired axis of rotation.

The thrusters are positioned on the main body of the water current generating device to provide sufficient torque about the desired axis of rotation to re-orientate the water current generating device to face the new direction of current flow. The thrusters are powered electrically, hydraulically or pneumatically. Power for the thrusters is provided either from systems onboard the water current generating device, from a separate sea or river bed mounted unit or directly from the shore via an umbilical/cable.

The thrusters would typically be used during periods when the flow was stationary or slow moving; thereby reducing the hydrodynamic forces acting on the main body of the water current generating device due to the current flow. This would reduce the thrust requirement on the thrusters, which would be designed to overcome only bearing friction, inertia and in certain cases weight and buoyancy forces acting on the water current generating device.

In a preferred embodiment the water current generating devices employs a horizontal axis rotor.

In a preferred embodiment the main body of the water current generating device is attached to the support structure by a single vertical axis yaw bearing.

In a preferred embodiment more than one thruster is used, being mounted either side of the yaw bearing to generate a yaw moment whilst creating a minimal net sideforce.

In a preferred embodiment the thrusters employed are of the bow and stern thruster type, as used on ships or submarines.

In a preferred embodiment a separate means of locking and releasing the main body of the water current generating device in the new orientation is provided. This locking device is released whenever the thrusters are being used to re-orientate the turbine, then the locking device is re-engaged to hold the turbine in the new orientation.

In a preferred embodiment mechanical position stops are included in order to ensure that the turbine is re-orientated to the desired angle without the need for accurate feedback control of orientation.

ADVANTAGES OF THE INVENTION

The principle advantages of the invention are:

The main body of the water current generating device can always generate power upstream of its support foundation, minimising the influence of the turbulent wake of the support structure on the main rotor.

The main body of the water current generating device can be attached to its foundation in a robust manner using a high structural integrity rotational bearing. This improves the survivability of the power generating device.

A thruster positioned at the end of the main body of the water current generating device has a much greater moment arm than a mechanical yaw drive acting on the much reduced radius of the rotational bearing. Less reaction force is therefore required to provide a given net torque about the axis of rotation compared to a mechanical yaw drive.

The potential problems of debris entrapment in an open geared or friction mechanical yaw drive are overcome by this invention.

The hydrodynamic thrusters are compact. The concept of aerodynamic yaw thrusters would not be practical for use on a wind turbine for example, due to the low density of air compared to water.

DETAILED DESCRIPTION WITH REFERENCE TO DRAWINGS

Different versions of the invention will now be described, by way of example and not in any limiting sense, with reference to the accompanying drawings in which.

Figure 1:
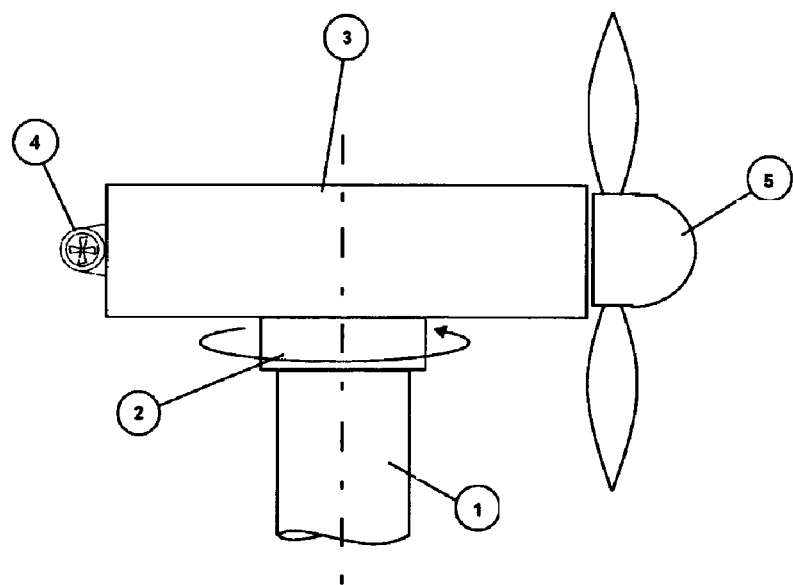
FIG. 1 is a side elevation of the simplest form of the re-orientation device, showing the main body of the water current generating device mounted on a vertical axis yaw bearing, and employing a single thruster.

Referring to FIG. 1, the horizontal axis rotor (5) is mounted on the end of the main body (3) of the water current generating device. The main body is attached to the fixed support structure (1) by a vertical axis yaw bearing (2). The current flows horizontally across the page from left to right or right to left. When the hydrodynamic thruster (4) is powered, the main body rotates in a horizontal plane about the yaw bearing to face the desired direction.

Figure 2:
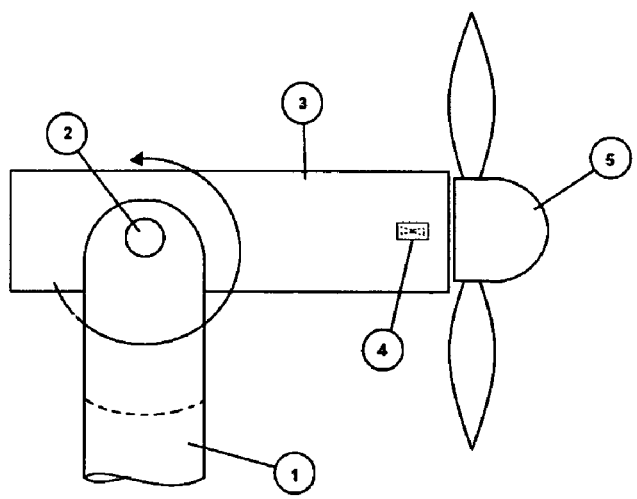
FIG. 2 is a side elevation of another version of the re-orientation device, showing the main body of the water current generating device mounted on a horizontal axis pitch bearing, and employing a single thruster.

Referring to FIG. 2, the horizontal axis rotor (5) is mounted on the end of the main body (3) of the water current generating device. The main body is attached to the fixed support structure (1) by a horizontal axis pitch bearing (2). The current flows horizontally across the page from left to right or right to left. When the hydrodynamic thruster (4) is powered, the main body rotates in a vertical plane about the pitch bearing to face the opposite direction. This arrangement only provides a +/−180 deg change in orientation of the device. The thruster is sufficiently powerful to overcome any weight or buoyancy moments acting on the main body+rotor about the axis of rotation.

Figure 3:
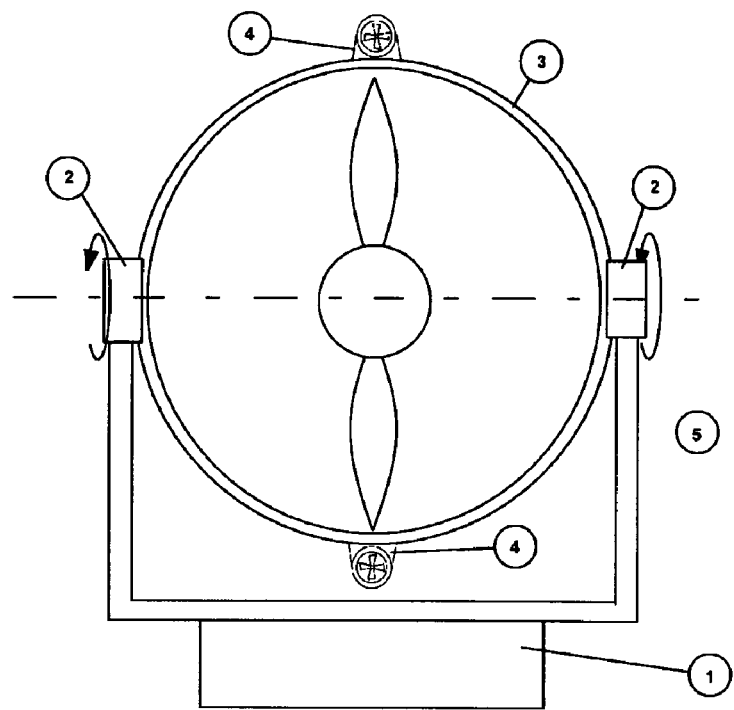
FIG. 3 is a front elevation of another version of the re-orientation device, in which the main body of the water current generating device is an annular housing mounted on twin horizontal axis yaw bearings, and employing a pair of thrusters.

Referring to FIG. 3, the horizontal axis rotor (5) is mounted within an annular housing which forms the main body (3) of the water current generating device. The main body is attached to the fixed support structure (1) by two horizontal axis pitch bearings (2). The current flows into and out of the page. When the hydrodynamic thrusters (4) are powered, the main body rotates in a vertical plane about the pitch bearing to face the opposite direction. This arrangement only provides a +/−180 deg change in device orientation.

Figure 4:
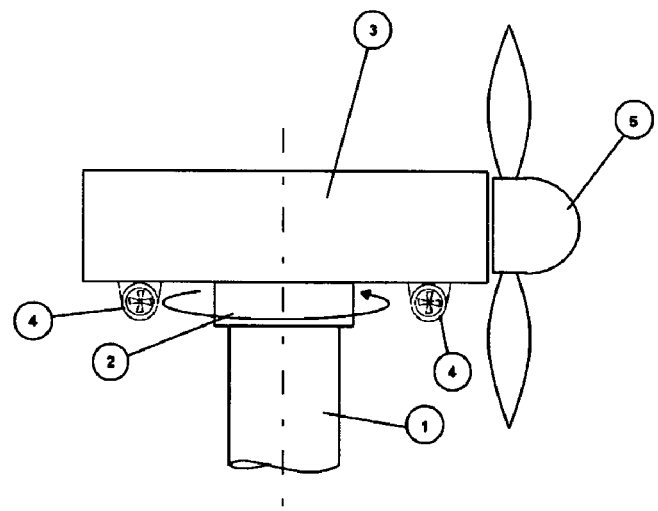
FIG. 4 is a side elevation of the simplest form of the re-orientation device, showing the main body of the water current generating device mounted on a vertical axis yaw bearing, and employing a pair of thrusters, one either side of the yaw axis.

Referring to FIG. 4, the horizontal axis rotor (5) is mounted on the end of the main body (3) of the water current generating device. The main body is attached to the fixed support structure (1) by a vertical axis yaw bearing (2). The current flows horizontally across the page from left to right or right to left. When the hydrodynamic thrusters (4) are powered, the main body rotates in a horizontal plane about the yaw bearing to face the desired direction. In this arrangement the two thrusters can be arranged to provide a pure yaw moment about the yaw bearing with no net sideforce.

Figure 5:
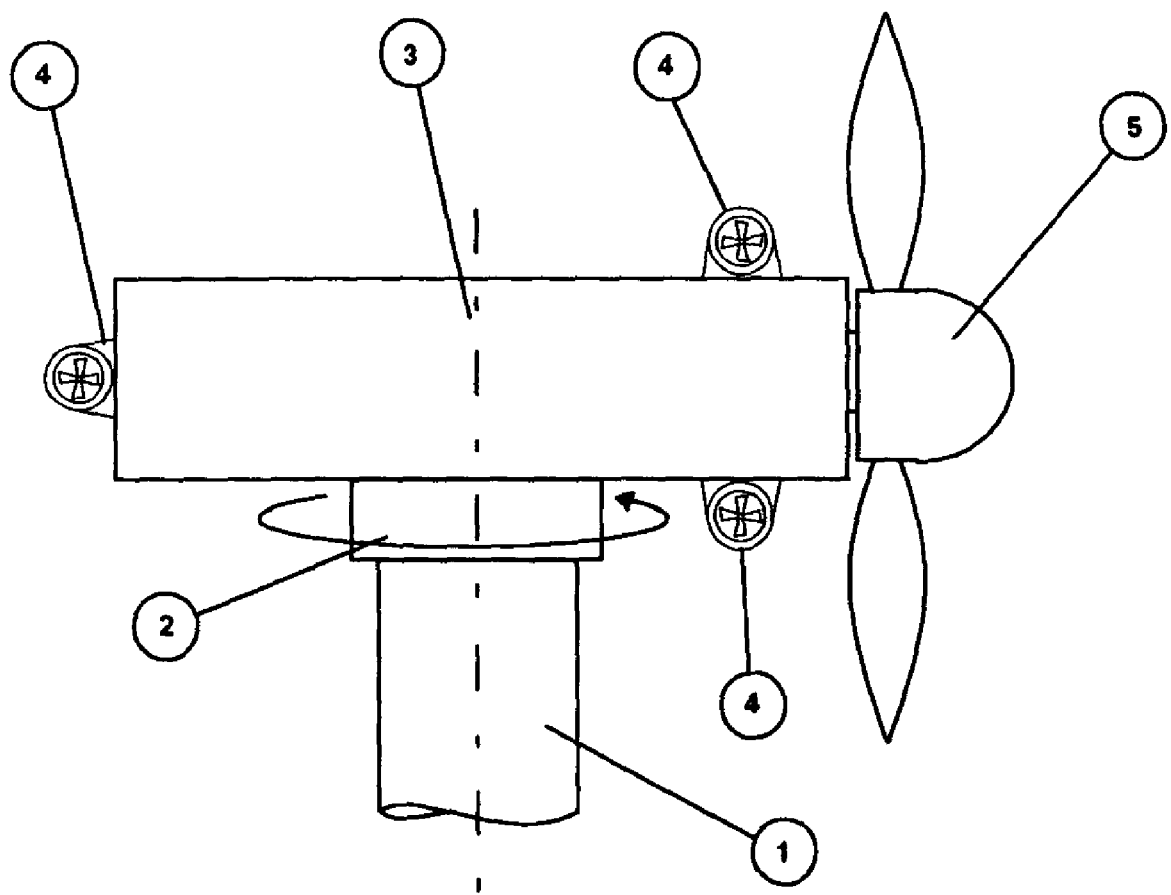
FIG. 5 is a side elevation of the simplest form of the re-orientation device, showing the main body of the water current generating device mounted on a vertical axis yaw bearing, and employing three thrusters.

Referring to FIG. 5, the horizontal axis rotor (5) is mounted on the end of the main body (3) of the water current generating device. The main body is attached to the fixed support structure (1) by a vertical axis yaw bearing (2). The current flows horizontally across the page from left to right or right to left. When the hydrodynamic thrusters (4) are powered, the main body rotates in a horizontal plane about the yaw bearing to face the desired direction. In this arrangement the three thrusters can be arranged not only to provide a pure yaw moment on the main body of the water current turbine, but also to control its orientation in the water when disconnected from the support structure during maintenance retrieval operations.

The invention claimed is:

1. A device for orienting a water current generating device to face oncoming current flow comprising:
    a main body;
    a hydrodynamic thruster fitted in an appropriate location of the main body, the hydrodynamic thruster exerts a torque on the main body about an axis of rotation; and
    a mechanical connection between the main body and a rigid sea or river bed support structure, wherein the mechanical connection provides only a single degree of freedom about the axis of rotation.

2. A device as in claim 1 wherein the mechanical connection is a rotational bearing.

3. A device as in claim 1 further comprising a plurality of hydrodynamic thrusters fitted in appropriate locations of the main body.

4. A device as in claim 1 further comprising a power source providing power to the hydrodynamic thruster, the power source is located onboard the water current generating device, on a surface vessel, on a separate sea or river bed mounted unit, or on shore.

5. A device as in claim 1 further comprising a plurality of position stops that control a final orientation of the main body relative to the support structure.

6. A device as in claim 1 further comprising a clamp or a mechanical lock to maintain an orientation of the main body relative to the support structure after the main body is re-orientated.

7. A water current power generating device including:
   a substantially rigid support structure which is located on, and affixed to, a bed of a body of water;
   a main body including a rotor device affixed thereto which is operable to generate power from a water current, the main body being located on the support structure by way of a mechanical connection which is adapted for rotation of the main body with respect to the support structure about a single axis of rotation; and
   at least one hydrodynamic thruster, separate to the rotor device and mounted on the main body, the at least one hydrodynamic thruster being operable to exert a torque on the main body of the device, thereby to cause rotation of the main body about the axis of rotation, so as to orient the rotor device with respect to the support structure.

8. A device as claimed in claim 7, wherein the mechanical connection between the main body and the support structure is a rotational bearing.

9. A device as claimed in claim 7, wherein a source of power for the or each hydrodynamic thruster is provided from a device located in a location chosen from one or more of: onboard the water current generating device, a surface vessel, a separate sea or river bed mounted unit, and directly from the shore.

10. A device as claimed in claim 7, further including position stops for control of a final orientation of the main body relative to the support structure.

11. A device as claimed in claim 7, further including a clamp device operable to clamp or mechanically lock the main body relative to the support structure, after the main body has been re-orientated.

12. A method of re-orientating a water current generating device to face the oncoming current flow, the water current generating device including hydrodynamic thrusters and a mechanical connection between its main body and its support structure allowing a degree of freedom about the desired axis of rotation, the method including:
   waiting until the water current flow speed is sufficiently low that the hydrodynamic moment exerted by the current on the main body of the water current generating device about the desired axis of rotation is less than the moment that can be exerted by the thrusters on the same body about the same axis; and
   then under these current flow conditions powering the thrusters to provide sufficient net torque to re-orientate the main body of the water current generating device about the desired axis of rotation until it faces the new current flow direction.

13. A method as claimed in claim 12, further including:
   powering the thrusters until the main body of the water current generating, device comes up against position stops which prevent further movement in that direction.

14. A method as claimed in claim 12, further including:
   clamping or mechanically locking the main body of the water current generating device relative to its support structure after the re-orientation is complete for the purposes of maintaining a constant orientation whilst generating electricity; and
   then releasing or mechanically unlocking the main body of the water current generating device again to effect subsequent further changes in its orientation.

15. A method as claimed in claim 12, further including:
   using the thrusters to control the orientation of the main body of the water current generating device in the water during maintenance operations when the main body may be partially or completely detached from the support structure.

* * * * *